J. M. COLEMAN.
TRUCK RETAINING CENTER BEARING.
APPLICATION FILED FEB. 18, 1914.

1,147,210.

Patented July 20, 1915.

Witnesses

Inventor
J. M. Coleman.
By
His Attorney

UNITED STATES PATENT OFFICE.

JAMES M. COLEMAN, OF MONTREAL, QUEBEC, CANADA.

TRUCK-RETAINING CENTER-BEARING.

1,147,210.  Specification of Letters Patent.  Patented July 20, 1915.

Application filed February 18, 1914. Serial No. 819,419.

*To all whom it may concern:*

Be it known that I, JAMES M. COLEMAN, a subject of the King of Great Britain, and resident of the city of Montreal, in the Province of Quebec and Dominion of Canada, have invented certain new and useful Improvements in Truck-Retaining Center-Bearings, of which the following is a full, clear, and exact description.

This invention relates to improvements in center bearings for car trucks, and the object is to provide a bearing which will attach and hold a car truck to the car body.

A further object is to provide means for attaching a car truck to the car body without the use of a king pin.

A still further object is to provide a connection between a car truck and body which will have a strength equal to or greater than the pins used at present for this purpose.

The device consists essentially of a pair of coöperating bearing members, one of which is provided with a flange surrounding the other member. These members are provided with coöperating lugs, which hold against separation. One member is in addition provided with a central flange or boss engaging in a recess of the other member, to serve the same purpose as the king pin at present in ordinary use.

Figure 1:
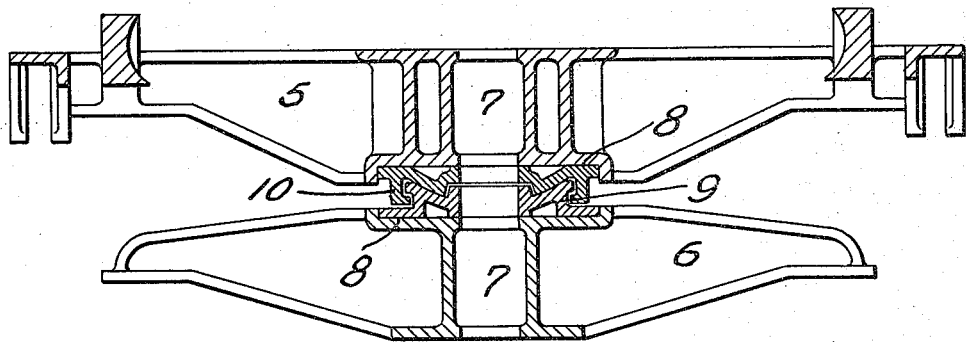
Figure 2:
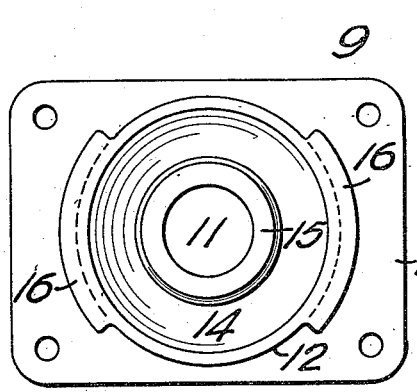
Figure 3:
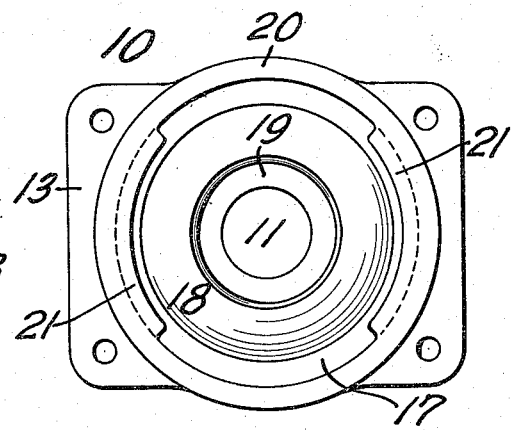
Figure 4:
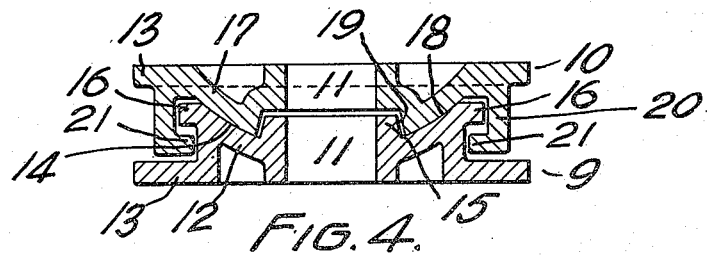

In the drawings which illustrate the invention:—Figure 1 is a longitudinal section of truck and body bolsters connected by the improved bearing. Fig. 2 is a plan view of the male bearing member. Fig. 3 is a plan view of the female bearing member. Fig. 4 is an enlargement of the section of the bearing shown in Fig. 1.

Referring more particularly to the drawings, 5 designates a body bolster and 6 a truck bolster, each having a central aperture 7 for the passage of a king pin, and a seat 8 surrounding these apertures for the reception of a center bearing.

The center bearing comprises male and female members 9 and 10 respectively, each having a central aperture 11 for the passage of a king pin.

The male member comprises a circular body 12 having attaching flanges 13 formed to fit the bolster seat 8. This body is formed concavely on its upper surface 14, the curvature being preferably spherically curved. At the center, an upstanding flange 15 is provided surrounding the pin opening 11, while at the periphery two diametrically opposite outwardly projecting lugs 16 are provided. These lugs project radially and each occupy approximately one-quarter of the body circumference, as clearly shown.

The female member consists of a circular body 17 having attaching flanges 13. This body is formed convexly on its surface 18 to coöperate with the concave surface 14 of the male member. An annular depression 19 is formed at the center surrounding the pin aperture 11 for the reception of the flange 15. The body is surrounded by a depending flange 20 adapted to embrace the body of the male member. This flange is provided with two internally projecting lugs 21 arranged diametrically opposite, each occupying approximately one-quarter of the flange's inner circumference. The proportion of the two members is such that the flanges of the two members are equidistant from the body centers. The lugs of the female member are, however, in a different plane from the lugs of the male member, as clearly seen in Fig. 4, so that when the two members are brought together, they may be revolved relatively without their lugs striking. Owing to the lugs of each member occupying approximately one-quarter of the circumference, it will be necessary to turn the members with their lugs at right angles in order to assemble the members, so that the lugs of one member will pass between the lugs of the other member, If the two members are now relatively revolved even a small amount, the lugs engage under one another and hold the members against separation. The central flange 15 of the male member engaging in the recess 19 of the female member holds the two members against relative movement perpendicular to the axes of the pin apertures 11.

When the device is applied to a car, one member is attached in the seat of the body bolster and the other member in the seat of the truck bolster The lugs of the two members engage under one another and hold the truck against separation on the body if the same is raised. This attachment is maintained through an arc of more than 170°, so that it will be readily seen the truck is permitted vastly greater radial movement than will ever be required. The flange 15 engaging in the recess 19 provides connection between the body and truck for traction purposes and serves the same purpose as the king pin. The only way in which the truck and body can become separated in an accident is by the truck becoming swung through an angle of exactly 90°. Trucks are, however, each provided with four very substantial corner chains which will effectually prevent such occurrence. The lugs being very large and heavy will not be readily broken, while the form and proportions of the flange 15 give it even greater strength than a pin passing through the apertures 11 would have. In manufacture, the flanges 15 and 20 and the lugs are made quite loose fits as clearly shown in Fig. 4, so that the whole load is supported by engagement of the spherically curved convex and concave faces. This looseness of fit combined with the spherically curved faces allows the body and truck a slight relative oscillation in any direction, so that the lugs and flanges are relieved of all minor shocks due to roughness of the track. This feature is in fact another advantage of the device, as it enables a slight but necessary flexibility between the body and truck to be maintained. If this flexibility is permitted with the ordinary king pin attachment, a rattling pin results. The castings for this bearing are no more expensive to manufacture than the present center bearing castings, but as the large steel pin is eliminated, a considerable saving is effected on each car. The main object of holding the trucks to the body in the event of accident is easily and inexpensively attained, and at the same time other subsidiary objects are attained without increasing the cost of manufacture or adding the complication of additional parts. In fact, the cost and the number of parts are both reduced.

Having thus described my invention, what I claim is:—

1. A center bearing comprising co-engaging convex and concave plates, interrupted flanges at the edges of said plates, and lugs on the flanges of one plate insertible through the interruptions of and embracing the flange of the other plate.

2. A center bearing for cars, comprising the combination with a car body and truck of a convex and a concave plate severally attached to the body and truck, interrupted flanges on said plates, lugs on the flange of one plate insertible through and embracing the flange of the other plate and holding the body and truck against separation through relative revolution of 90°, a centrally disposed recess in one plate, and a centrally disposed projection in the other plate engaging in said recess and forming draft mechanism for the truck.

In witness whereof, I have hereunto set my hand in the presence of two witnesses.

JAMES M. COLEMAN.

Witnesses:
S. R. W. ALLEN,
G. M. MORELAND.